United States Patent
Labbe et al.

(10) Patent No.: US 12,535,310 B2
(45) Date of Patent: *Jan. 27, 2026

(54) ESTIMATING TRACKING SENSOR PARAMETRIZATION USING KNOWN SURFACE CONSTRAINTS

(71) Applicant: SportsMEDIA Technology Corporation, Durham, NC (US)

(72) Inventors: Roger R. Labbe, Gilroy, CA (US); Divya Ramakrishnan, Santa Clara, CA (US); Lavanya Sridharan, Fremont, CA (US); Richard H. Cavallaro, Mountain View, CA (US); Marvin S. White, San Carlos, CA (US)

(73) Assignee: SportsMEDIA Technology Corporation, Durham, NC (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/583,303

(22) Filed: Feb. 21, 2024

(65) Prior Publication Data

US 2024/0191983 A1 Jun. 13, 2024

Related U.S. Application Data

(63) Continuation of application No. 18/119,075, filed on Mar. 8, 2023, now Pat. No. 11,913,768, which is a
(Continued)

(51) Int. Cl.
*G01B 11/00* (2006.01)
*G01S 5/16* (2006.01)
(Continued)

(52) U.S. Cl.
CPC .............. *G01B 11/002* (2013.01); *G01S 5/16* (2013.01); *G06T 7/20* (2013.01); *G06T 7/292* (2017.01);
(Continued)

(58) Field of Classification Search
CPC . G06T 2207/30196; G06T 2207/30241; G06T 7/20; G06T 7/292;
(Continued)

(56) References Cited

U.S. PATENT DOCUMENTS 5,862,517 A 1/1999 Honey et al.
5,912,700 A 6/1999 Honey et al.
(Continued)

OTHER PUBLICATIONS

Agarwal, et al., "Bundle Adjustment in the Large", Jan. 1, 2010.
Triggs, et al., "Bundle Adjustment—A Modern Synthesis", Vision Algorithms'99, LNCS 1883, pp. 298-372, Sep. 21, 1999.

*Primary Examiner* — An H Do
(74) *Attorney, Agent, or Firm* — NEO IP

(57) ABSTRACT

A sensor system and a method of operating a sensor system including a plurality of sensors tracking a moving object in an area having known bounding surfaces. The apparatus and method calculate a time-specific position of the object based on data and sensor parameters from at least two of the plurality of sensors and determine errors between the calculated time-specific positions calculated. The method and apparatus calculate a minimum system error attributable to the at least two sensors by constraining at least one dimension in the data of the sensor used in the calculated time-specific position of the object associated with the sensor, the constraining based on an object/surface interaction, the minimum system error calculated by solving for modified sensor parameters for each sensor.

20 Claims, 8 Drawing Sheets

Related U.S. Application Data continuation of application No. 17/236,484, filed on Apr. 21, 2021, now Pat. No. 11,604,061, which is a continuation of application No. 16/899,025, filed on Jun. 11, 2020, now Pat. No. 10,989,519, which is a continuation of application No. 16/295,834, filed on Mar. 7, 2019, now Pat. No. 10,684,117, which is a continuation of application No. 15/293,106, filed on Oct. 13, 2016, now Pat. No. 10,234,270.

(51) Int. Cl.
*G06T 7/20* (2017.01)
*G06T 7/292* (2017.01)
*H04N 7/18* (2006.01)

(52) U.S. Cl.
CPC ... *H04N 7/181* (2013.01); *G06T 2207/10021* (2013.01); *G06T 2207/30224* (2013.01)

(58) Field of Classification Search
CPC .......... G06T 2207/10021; G06T 2207/30224; H04N 7/181; G01B 11/002; G01S 5/16
See application file for complete search history.

(56) References Cited

U.S. PATENT DOCUMENTS

| | | | |
|---|---|---|---|
| 7,221,794 | B1 | 5/2007 | James et al. |
| 7,341,530 | B2 | 3/2008 | Cavallaro et al. |
| 8,335,345 | B2 | 12/2012 | White et al. |
| 8,659,663 | B2 | 2/2014 | Elangovan et al. |
| 11,913,768 | B2 * | 2/2024 | Labbe .................... H04N 7/181 |
| 2003/0036849 | A1 | 2/2003 | Ford et al. |
| 2018/0106592 | A1 | 4/2018 | Labbe, Jr. et al. |
| 2019/0204066 | A1 | 7/2019 | Labbe et al. |
| 2020/0300605 | A1 | 9/2020 | Labbe et al. |
| 2021/0239453 | A1 | 8/2021 | Labbe et al. |
| 2023/0221108 | A1 | 7/2023 | Labbe et al. |

* cited by examiner

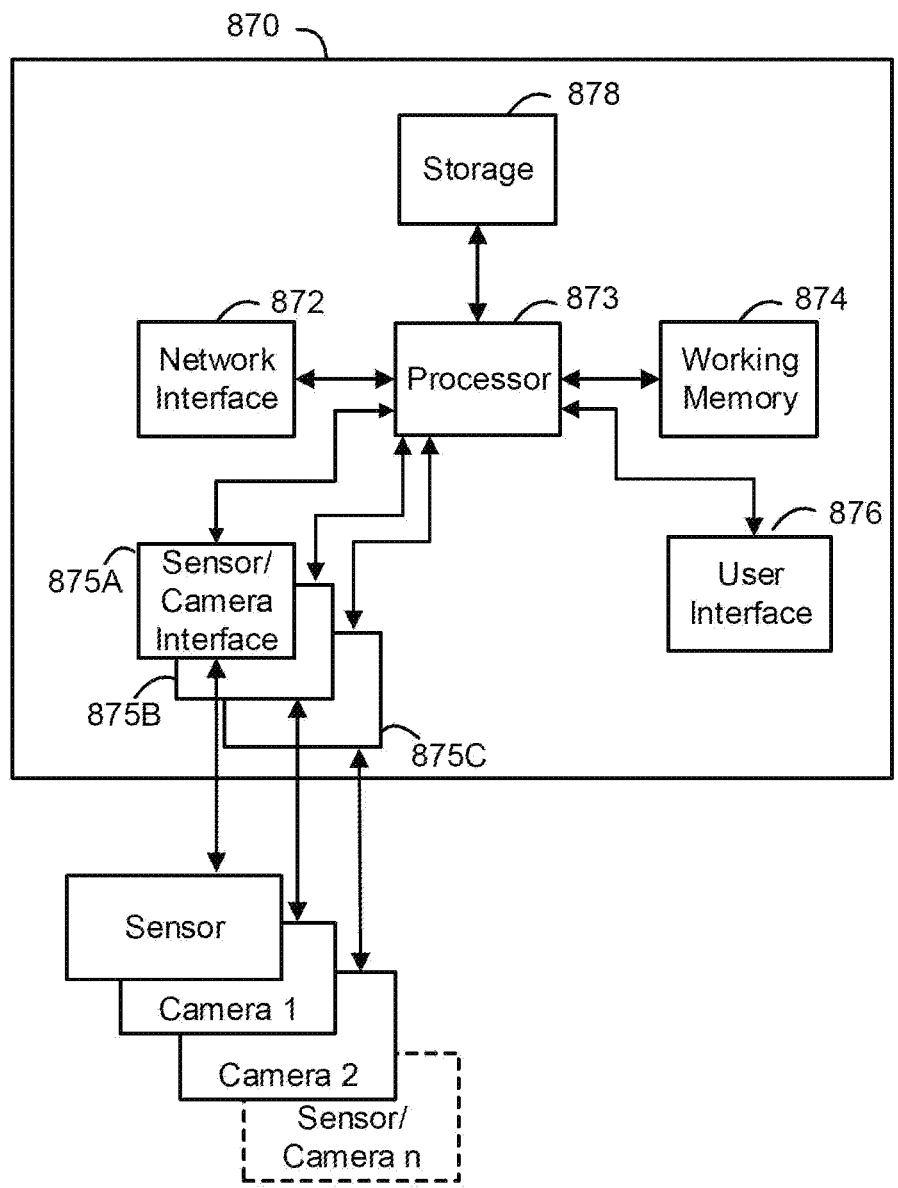

ESTIMATING TRACKING SENSOR PARAMETRIZATION USING KNOWN SURFACE CONSTRAINTS

CROSS REFERENCES TO RELATED APPLICATIONS

This application is related to and claims priority from the following US patents and patent applications. This application is a continuation of U.S. patent application Ser. No. 18/119,075, filed Mar. 8, 2023, which is a continuation of U.S. patent application Ser. No. 17/236,484, filed Apr. 21, 2021 and issued as U.S. Pat. No. 11,604,061, which is a continuation of U.S. patent application Ser. No. 16/899,025 filed Jun. 11, 2020 and issued as U.S. Pat. No. 10,989,519, which is a continuation of U.S. patent application Ser. No. 16/295,834, filed Mar. 7, 2019 and issued as U.S. Pat. No. 10,684,117, which is a continuation of U.S. patent application Ser. No. 15/293,106, filed Oct. 13, 2016 and issued as U.S. Pat. No. 10,234,270, each of which is hereby incorporated by reference in its entirety.

BACKGROUND OF THE INVENTION

Object tracking technologies have been used in any number of cases to augment user experiences for events. One example of such a system is illustrated in U.S. Pat. Nos. 5,862,517 and 5,912,700, both of which are hereby fully and specifically incorporated herein by reference, which describes a detection system utilizing an infrared source in an object which is tracked by a tracking system utilizing infrared sensors and visual imaging cameras. In order to accurately track an infrared source in an object, accurate knowledge of a number of parameters for each of the sensors must be maintained and regularly updated. It is not practical to measure such parameters in real time during an event, and hence registration and parameter updating techniques have been developed to maintain system accuracy.

SUMMARY OF THE INVENTION

The technology, briefly described, includes a method of operating a sensor system including a plurality of sensors tracking a moving object in an area having known surfaces. The method includes calculating a time-specific position of the object based on data and sensor parameters from at least two of the plurality of sensors and determining errors between different measured object positions of the plurality of sensors, or measured object positions and estimated positions. The method also includes calculating a minimum system error by constraining at least one dimension in the measured data of the sensor used in determining the time-specific position of the object, the constraining based on an object/surface interaction, the minimum system error calculated by solving for modified sensor parameters for each sensor.

Another aspect includes one or more computer readable storage mediums having computer readable program code embodied on said computer readable storage mediums, said computer readable program code for tracking an object, said computer readable program code including: code adapted to cause a processor to accumulate data from at least a first and second sensors, each sensor having associated sensor parameters adapted to allow determination of a position of the object based on data from said sensor. The one or more computer readable storage mediums also includes code adapted to cause a processor to determine a new value for at least one of said sensor parameters by calculating a minimum error between at least a position determined using data from the first sensor and a position determined using data from the second sensor by constraining a calculation of a total system error between the first sensor and the second sensor using a known position of the object when interacting with a known bounding surface position.

The technology further includes an apparatus for tracking an object, including: a plurality of sensors, including a first sensor and a second sensor, each sensor having associated sensor parameters used to determine a position of the object based on data from said sensor; and one or more processors in communication with said sensors. The one or more processors are programmed to: accumulate data from at least said first and second sensors using initial sensor parameters; calculate an error in a position of the object derived from accumulated data from the first and second sensors and the initial sensor parameters associated with the first sensor and the second sensor; determine interaction between the object and a known surface which constrains motion of the object in at least one dimension when the object interacts with the known surface; and determine a new value for at least one of said sensor parameters by minimizing a total system error attributed to at least the first and second sensors, the minimizing calculated by constraining derived positions of the first sensor and the second sensor to positions identified by interaction of the object with the surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is an illustration of a processing facility suitable for use in performing the present technology.

DETAILED DESCRIPTION

Embodiments of the present technology can be used to track an object in a bounded area. In general, the technology is useful in detecting objects in a sporting event where an object which is part of the event, such as a hockey puck in a hockey game, a baseball in a baseball game, or a basketball in a basketball game. The technology utilizes a multi-sensor tracking system using visible and/or infrared sensors to accumulate data on the position of a moving object. An initial determination of the positions of known bounding surfaces in a bounded area (such as a hockey rink) is made. An object moving within the bounded area is tracked and interactions of the object with known bounding surfaces are determined. A surface map identifying the known bounding surfaces is then created. To track a moving object and determine its position, sensor parameters are initially determined. After accumulating data of an object moving within the bounded area, sensor parameters across all sensors in the system can be estimated with greater accuracy by analyzing the interactions of the object with the known bounding surfaces and minimizing any errors in positional data accumulated by a number of sensors using bundle adjustment techniques with positions constrained by the known positions of the bounding surfaces. The new, estimated sensor values can then be used to track objects in the bounded area during an event with greater accuracy than the initially determined sensor values.

The present technology may be utilized in any number of implementations wherein detectable constraints in the form of known surfaces are available for a tracked object. The technology will be described herein with reference to tracking a hockey puck within a hockey rink. A hockey rink has well defined surfaces which constrain motion of a puck within defined boundaries. While each boundary is relatively hard, there may be some variance (flex) in some of the boundaries with which a puck will interact with within the rink. For example, a puck engaging a side board of the rink at high speed may cause the board to flex a small amount at impact.

Figure 1:
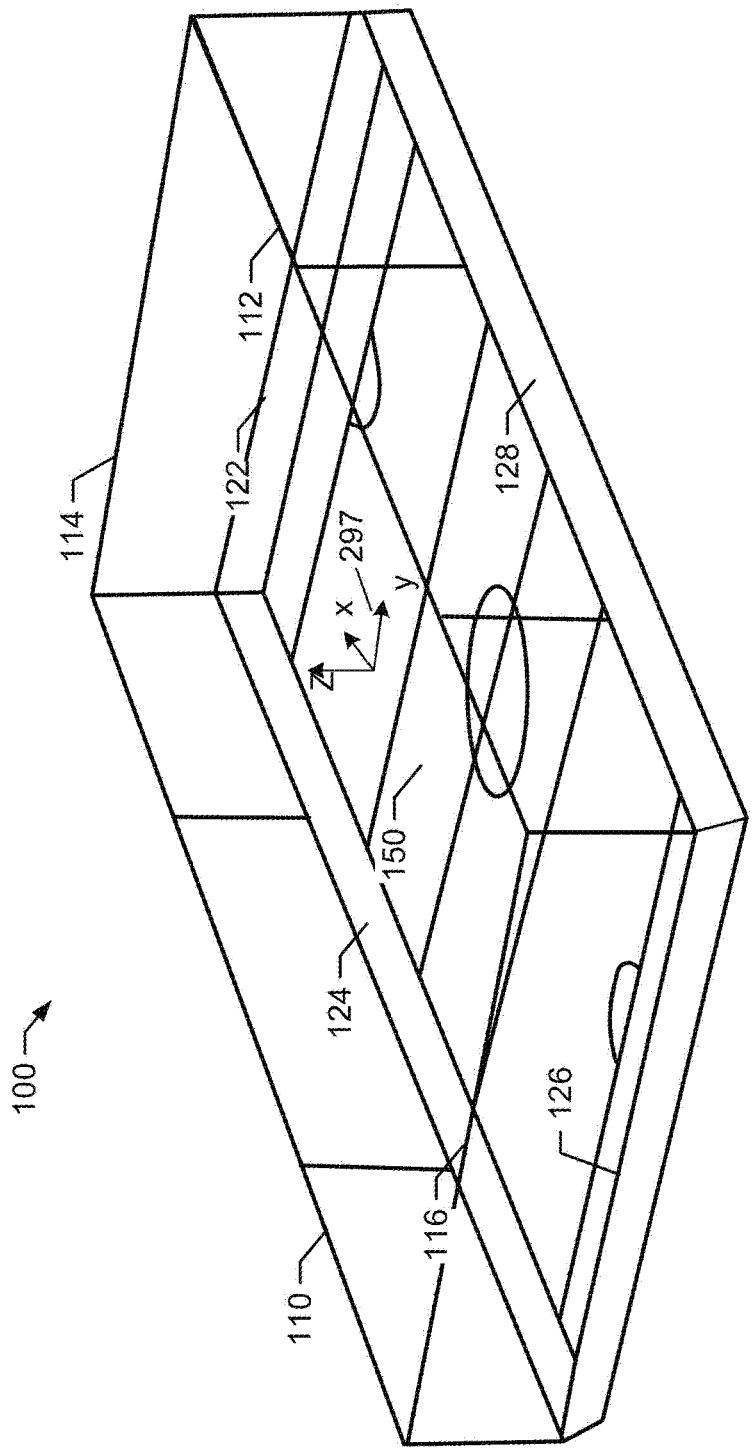
FIG. 1 is a perspective diagram of a hockey rink illustrating known bounded surfaces which may be used as constraints in accordance with the present technology.

FIG. 1 illustrates a number of known bounding surfaces for a hockey rink 100. It will be understood that the illustration in FIG. 1 is a simplistic view of a hockey rink and that a typical hockey rink includes more complex geometric features such as player benches, penalty boxes, which complicate the geographic model of the rink. A typical hockey rink 100 is generally rectangular, with rounded corners, and housed in a stadium or arena having seating for observers of a game occurring on a rink. The rink includes a playing surface 150 generally formed of ice (though some forms of hockey may be played on other surfaces). The edges of the rink are marked by walls or "boards" 122, 124, 126, and 128 rising approximately 40 to 48 inches high. Boards 122, 124, 126, and 128 represent one aspect of the known bounding surfaces of a hockey rink 100. In addition to the boards, acrylic glass walls 110, 112, 114, 116, 118, 120 may extend above the rink and the boards and allow an audience to safely view the hockey game in progress. Walls 110, 112, 114, 116, 118, 120 represent another set of known bounding surfaces of rink 100. As will be understood, the walls 110, 112, 114, 116, 118, 120 may not be as structurally rigid as boards 122, 124, 126, 128, and therefore may flex when a hockey puck engages them. Each of these surfaces represents a known boundary surface that can be represented in a surface map for use in optimizing sensor parameters in a system 200, described below, which may be used to track a hockey puck during a game.

Also illustrated in FIG. 1 is a world coordinate system 297, discussed below.

Figure 2:
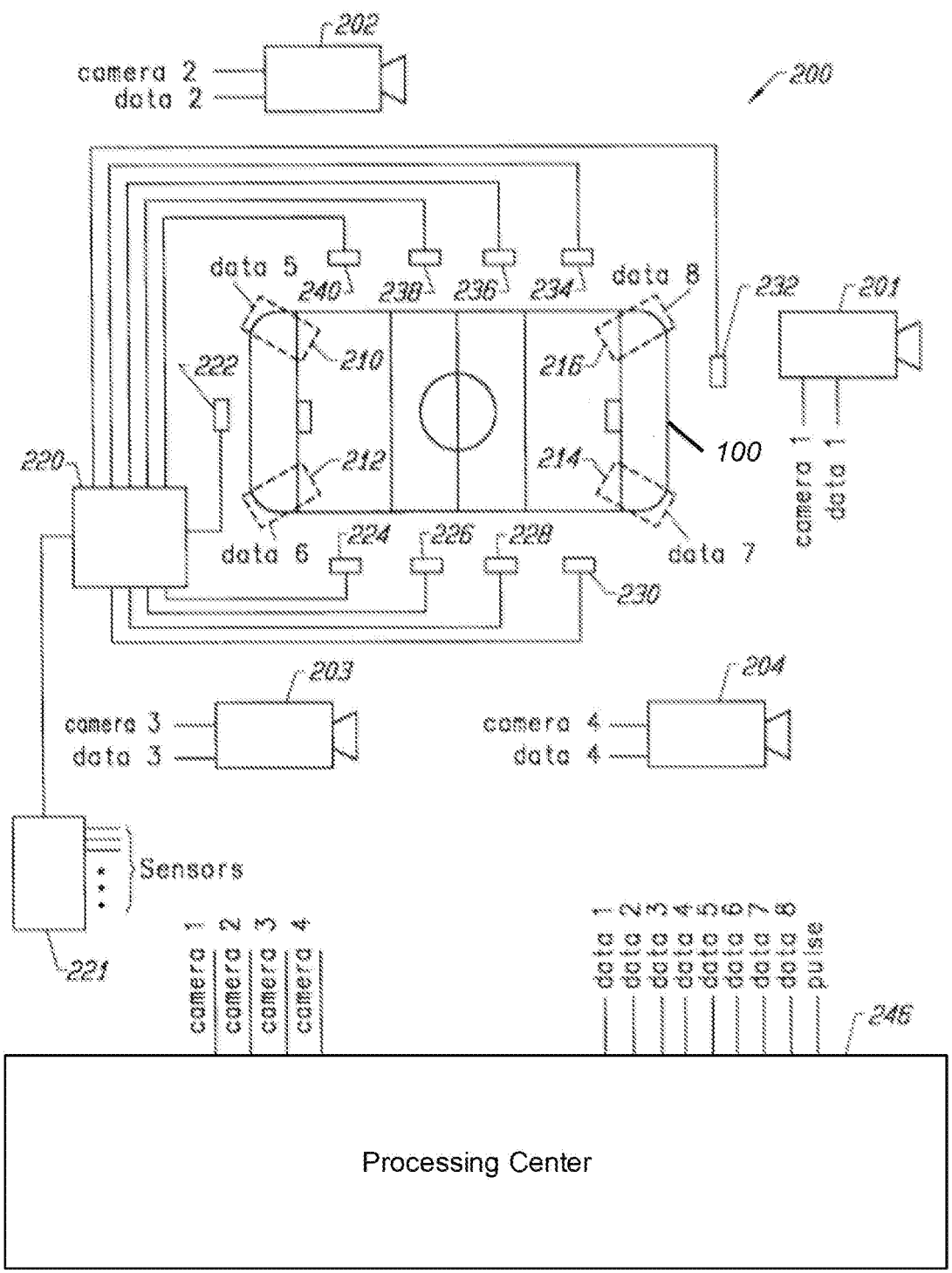
FIG. 2 is a block diagram illustrating a system suitable for implementing the present technology.

FIG. 2 illustrates a system 200 that includes one or more sensors which can be used to detect the location of an object such as a puck in three dimensional space and/or the position of the object in a video frame. An infrared sensor can determine the angle or direction of the puck from the sensor using techniques known in the art. Two or more infrared sensors can be used to determine the three dimensional location of the puck. The three dimensional location of the puck can be used, in conjunction with the broadcast camera's location, orientation and field of view to locate the puck in the video frame and enhance the television presentation of the puck. System 200 is described in further detail in the U.S. Pat. Nos. 5,862,517 and 5,912,700.

The puck used in system 200 is comprised of a rubber body member having a flat top surface, a flat bottom surface and a side surface or outer circumference. Infrared emitting diodes are fitted in bores in the puck on the top, bottom and outer side surfaces.

System 200 may include four camera locations 201, 202, 203 and 204. The various camera locations can be located anywhere in an arena which contains a hockey rink 100 suitable for capturing video images of puck 10 in hockey rink 100. Each camera location includes a broadcast camera and communicates with processing center 246.

System 200 includes one or more infrared sensors. The number of sensors used depends on cost and desired accuracy. In one embodiment 8-10 sensors are used. To ease setup, wiring and maintenance, as well as increase the chance that the puck will be in the field of view of an infrared sensor, one or more infrared sensors are located at the camera location. However, locating infrared sensors at the camera locations is optional. The sensors at the camera location communicate with processing center 246 via data 1, data 2, data 3 and data 4. System 200 also includes additional sensor locations, 210, 212, 214 and 216, which are not located at the camera locations. While 8 sensors are illustrated, it will be understood that any number of sensors and associated data lines may be utilized in accordance with the present technology.

System 200 also includes collector box 220 which is connected to pulse detectors 222, 224, 226, 228, 230, 232, 234, 236, 238 and 240. The pulse detectors are used to detect when puck 10 is pulsing on so that the infrared sensors will open their shutter in synchronization with the puck's pulses. In one embodiment, the pulse detectors include a photo detector, which includes a photo diode and op-amp. A system that uses a puck which continuously transmits an infrared signal would not need pulse detectors. In one option, the pulse detectors can be located at the top of the glass which surrounds the ice. Alternatively, the pulse detectors are mounted from the ceiling of the arena, mounted at other suitable locations in the arena, or some combination of the above.

Collector box 220 is connected to synchronizer processor 221. Some embodiments of the current system use additional pulse detectors that are connected to an additional collector box. Additional collector boxes could also be connected to synchronizer processor 221. For example, to increase coverage or redundancy, it may be desired to have two collector boxes, with each collector box being connected to ten pulse detectors. All ten pulse detectors can be mounted to the roof of the arena or placed in other suitable locations.

Synchronizer processor 221 sends a control signal and a 30 Hz reference signal to collector box 220 (and any other collector boxes). Synchronizer processor 221 receives a data signal back from collector box 220. Additionally, synchronizer processor 221 sends a composite synchronization signal to each of the infrared sensors.

Synchronizer processor 221 receives the data from one or more collector boxes in order to extract a repeatable pulse train with a frequency of, in this case, 29.85 Hz±0.10 Hz. Interference from 60 Hz sources is identified and discarded. Synchronizer processor 221 includes a processing device and associated input/output hardware to receive data from the sensors and synchronize the sensor interaction.

Synchronization processor 221 receives data from collector box 220 about the various pulse detectors in order to identify one or more pucks. For example, synchronization processor 221 is designed to detect that the puck should be pulsing at approximately 29.85 Hz±0.10 Hz. Thus, synchronizer processor, with suitable software, can look for data points that repeat at that frequency. The system may find that more than one set of data fit such a rule and, thus, the system may determine that there are two pucks (or sources) being tracked. Data that does not fit into a stream of pulses at the determined frequency is discarded.

In order to track the position of an object, the sensors are calibrated in a registration process. Registration is the process of defining how to interpret data from a sensor (a camera being one type of sensor). The sensors described above output data, for example, related to position. Since position is relative, the system needs a reference from which to determine position or location. Thus, in order to be able to use positional data, the system needs to know how to interpret the positional data to make use of the information. One example of how to interpret data from different sensors is to use the matrices described in U.S. Pat. Nos. 5,862,517 and 5,912,700. In that embodiment, defining how to interpret data includes determining the matrices.

In order to detect the position of an object in a frame captured by an infrared or visible camera sensor, a processor determines a line of position (LOP) for each cluster of each sensor. The LOP is first calculated in camera space and then transformed to a three dimensional vector in the coordinate system of the arena.

Figure 3:
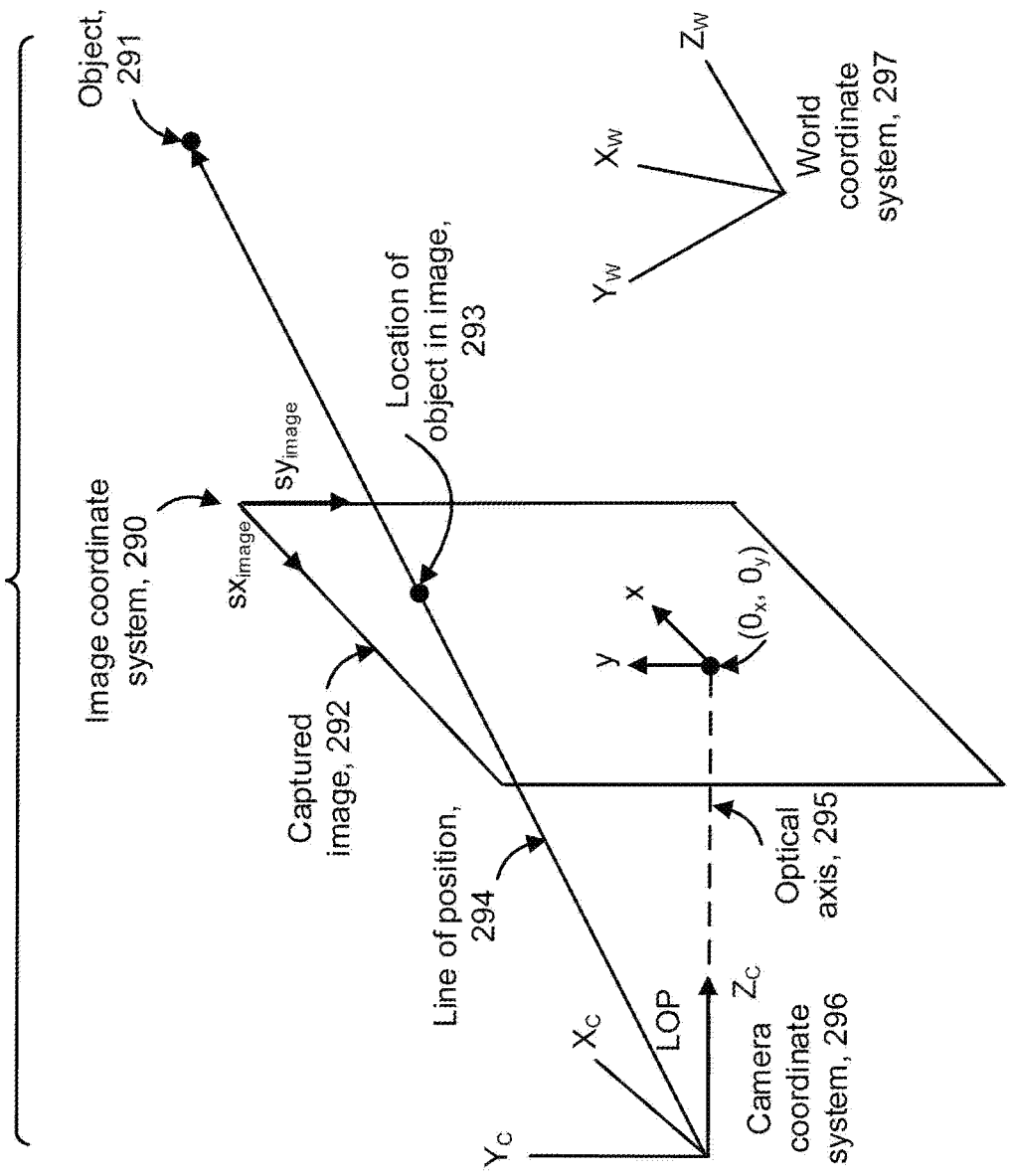
FIG. 3 is a depiction of a relationship between camera, image and world coordinate systems.

FIG. 3 depicts a relationship between camera, image and world coordinate systems, for use by the processing facility of FIG. 2 for tracking a path of an object. A camera coordinate system 296, which includes orthogonal axes $X_C$, $Y_C$ and $Z_C$ in three dimensions, is fixed relative to the camera. The origin of the coordinate system may be at the center of projection of the lens, in one possible approach, modeling the camera as a pinhole camera. An image coordinate system 290, also referred to as pixel space or image space, includes orthogonal axes X and Y in two-dimensions, and is fixed relative to a captured image 292. A world coordinate system 297, also referred to as world space, which includes orthogonal axes $X_W$, $Y_W$ and $Z_W$, is fixed relative to, e.g., the earth, a hockey rink or other event site, or other reference point or location. Image space is an example of a 2D space, whereas world space is an example of a 3D space. Generally, it is desirable to describe the position and/or path of the tracked object 291 (e.g., a puck) in the world coordinate system 297, which is a 3D coordinate system, as this is typically the coordinate system in which its motion is most relevant to the user, and allows easier integration of the information from several cameras. The line of position 294 is an imaginary line which extends from the origin of the camera coordinate system 296, which as noted above can be the center of projection of the lens, through a pixel in the image 292, intersecting the pixel at a point 293, and through the tracked object 291. Each pixel in the image 292 corresponds to a different LOP. Point 293 in the captured image 292 represents the location of an object 291 in the sensor data. The location of the object in the image 292 can be represented by coordinates (sx, sy) in a coordinate system which has its origin at a corner of the image, in one approach. The coordinates may identify the center of the object.

Further, the line of position can be represented by a 3-D vector (LOP) which has unity magnitude, in one approach. The vector can be defined by two points along the LOP. Alternatively, the vector can be defined by one point along the LOP, if the center of projection of the lens is known. The vector can be represented in the world coordinate system 297 using an appropriate transformation from the image coordinate system. The $Z_C$ axis of the camera coordinate system, which is the optical axis 295 of the camera, intersects the captured image at a point represented by coordinates $(0_x, 0_y)$. A two-dimensional coordinate system extending from $(0_x, 0_y)$ can also be defined.

The sensor registration process involves obtaining one or more transformation matrices which provide a conversion between the image coordinate system 290 and the world coordinate system 297. Registration is described below and further information can be found in U.S. Pat. Nos. 5,912,700, and 6,133,946.

Figure 4:
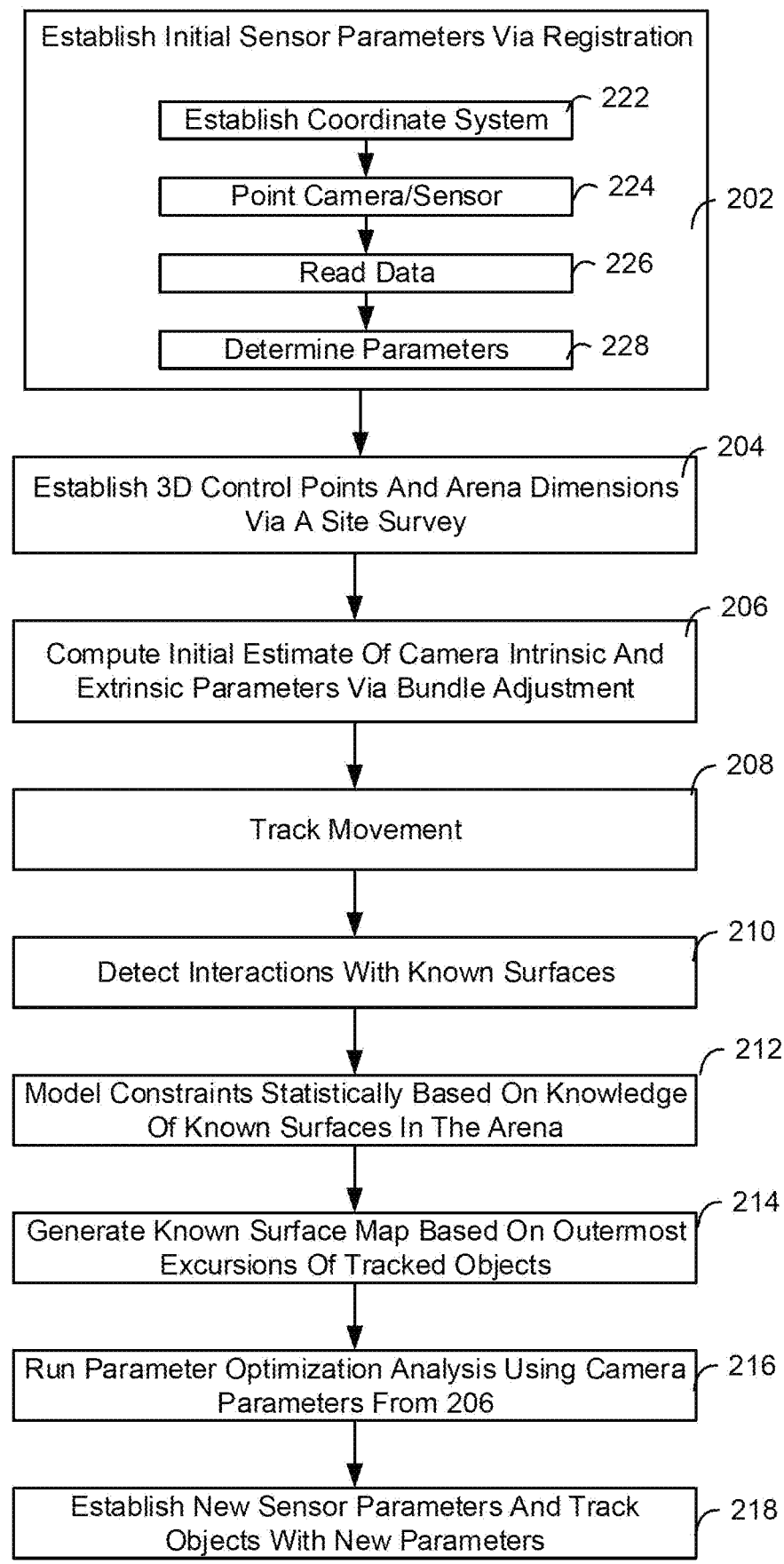
FIG. 4 is a flowchart illustrating a process of building a surface map of known boundaries which is useful in estimating sensor parameters for tracking objects.

FIG. 4 illustrates a method in accordance with the technology for estimating camera parameterization in a system such as system 200 which includes a plurality of sensors and based on known bounds of an object in a bounded area. In such a system, as a practical matter, as the environment changes, it is not practical to determine changes in individual sensor parameters. In addition, while techniques have been developed to determine camera error, it is not possible through an automated process to determine a specific error in a specific sensor. In such a system, errors from multiple sensors may contribute to an overall system error. Hence, minimizing the total system error provides a means for more accurately determining the position of an object relative to the data provided by all the sensors for a position calculation.

The present technology provides a mechanism for estimating new sensor parameters which can then be used to provide object tracking with greater accuracy by reducing the overall error attributed to all cameras in a system such as system 200.

The method of FIG. 4 begins at step 202 by establishing the initial pose and intrinsic sensor parameters for sensors via a registration process. The initial parameters comprises the camera attitude, pitch, roll, heading, field of view, and distortion coefficients. Although distortion can be irregular or follow many patterns, the most commonly encountered distortions are radially symmetric and defined in terms of distortion coefficients which can be applied to sensor data to correct for distortion in acquired data.

Registration 202 includes sub steps 220, 222, 224 and 226, A first sub step 220 is to establish a world coordinate system, which may be accomplished by using x, y, z axes with the origin or center point (0,0,0) being at the center of the hockey rink, on the ice. In one embodiment, three or more registration points (e.g. eight) are marked on the rink in addition to the center location. The distance from the center point, the walls and neighboring points can be measured for each registration point so that the coordinates of the registration points can be computed. The sensors can be registered by solving for the unknown variables in a positional matrix. In other systems, the center point can be anywhere appropriate.

Generally, a processor 873 in the processing center 246 (see FIG. 8) determines the position of the puck in a video frame of a camera. A processor 873 transforms the three dimensional location of the puck to a two dimensional position in the video frame of the selected broadcast camera. A sensor is represented mathematically by a 4×4 matrix which includes details of position and orientation. The three dimensional point is transformed into a two dimensional normalized frame location by multiplying the point by a camera matrix (K). The sensor matrix (K) in its simplest form is a combination of rotation, translation, and perspective elements, all of which are represented by 4×4 matrices. In reality, the motion of the sensor point of view (POV) is much more complicated with offsets caused by the kinematics of the tripod and the motion of the optical POV along the camera's optical axis due to lens characteristics. All these effects can be modeled as more complex linkages (additional matrices) between the fixed sensor base and the resulting POV of the sensor as the sensor is moved through its range of controls. These techniques are well-known in the art.

The sensor is modeled as a 4×4 matrix which includes two parts—a fixed transformation (X) which represents the position of the sensor in the arena and its orientation, and a variable transformation (V) which varies with changes in pan angle, tilt angle and the zoom.

The fixed transformation matrix (X) models x, y, z position as well as fixed yaw, pitch and roll representing the sensor mount orientation which is a function of other matrices defining the sensor pitch, yaw and roll.

Registering the sensor on a movable camera involves the determination of the matrix (X). In step 222, a camera, for example, is pointed at each registration mark in turn, centering the registration mark in the field of view using the center reference mark in the viewfinder. In step 224, the pan and tilt angles are read and the variable part of the camera transform is calculated for each mark using an arbitrary constant zoom value. (In one embodiment, zoom is not a factor in these comparisons, as each registration mark is centered in the field of view on the camera's optical axis. Some constant value is used so errors of different registration marks can be directly compared.) In step 226, the matrix parameters are determined. An initial educated guess at the parameters (e.g. x, y, z, yaw, pitch, roll) is made and the fixed component matrix is calculated. For each registration point, the fixed matrix (X) is concatenated (multiplied) with the variable matrix (V) for each registration point to obtain the composite camera matrix. Then, the three dimensional location of the registration point is transformed by the composite camera matrix to a two dimensional position in the broadcast camera's video frame. A camera or sensor error is determined representing the distance from the calculated two dimensional position to the center of the video frame. The fixed transformation parameters are varied until the camera error is minimized, at which point the camera is said to be registered and the resulting fixed matrix (X) is used for subsequent calculations.

To register a stationary infrared sensor that is not mounted on a broadcast camera, infrared emitters are placed at the registration points. Since these sensors are rigidly mounted, they cannot be panned and tilted. At least some of the infrared emitters must, therefore, be placed within the field of view of the sensor. In step 224, the sensor detects the emitters, and clusters are created. In step 226, an initial educated guess is made at the parameter values for the transformation matrix (J) and the 2D projections of the three dimensional locations of the registration marks are determined using matrix (J). An error number is determined between the calculated locations (via the matrix) and observed locations of the registration marks on the sensor's CCD. The parameters are varied and the process is repeated until the sensor error is minimized, at which time the sensor is said to be registered and the resulting matrix is used for subsequent calculations.

Registering a camera-mounted infrared sensor is the process of determining a matrix (O). First the broadcast camera on which the infrared sensor is mounted is registered (the X matrix is determined). In step 222, infrared emitters are placed at the registration marks and the broadcast camera is oriented to give the sensor a view of the infrared emitters. In step 224, the sensor detects the emitters. The pan and tilt angles are read and those matrices modeling the camera's pan, tilt axis as a fixed distance, tilt axis as a variable distance and tilt angle are calculated, In addition, a modeling the effective focal length of the lens is calculated using the measured focal length of the sensor. A matrix (O) is the only undetermined part of the equation. A first educated guess is made at the matrix (O) parameters and the composite transformation matrix is calculated. The three dimensional locations of the registration marks are calculated using the transformation matrix and a sensor error is determined between calculated location and the measured location of the registration marks. The parameters are varied until the sensor error is minimized, at which time the sensor is said to be registered and the determined matrix (O) is used for subsequent calculations. Alternatively, the x, y, z offsets of the infrared sensor relative to the camera plate can be measured directly rather than solving for them.

As an alternative, the location and orientation of the broadcast cameras and sensors can be measured relative to the center location. Any suitable distance measurement tool can be used to determine the position of the cameras and sensors, or the cameras and sensors can be surveyed.

Once registration is complete at 202, then 204, 3D control points and the bounded area dimensions are established by means of a survey or measurement. The 3D control points are established by placement of infrared emitters at known locations, while the survey allows for definition of the bounding surfaces (such as those described in FIG. 1) using a repeatable measurement means.

At 206, an initial estimate of each sensor's intrinsic and extrinsic parameters is computed via bundle adjustment. This process is described further below with respect to FIG. 5. Briefly, in this context, bundle adjustment attempts to minimize the total error of all sensors in the system relative to a detected position of a tracked object.

Once the initial estimate of the intrinsic and extrinsic parameters are computed, an object may be tracked at 208. Tracking of the object 208 may constitute tracking an object during an event or some other period within the bounded area. Tracking of an object occurs in the manner described in the aforementioned U.S. Pat. No. 5,862,517.

At 210, object/surface interactions with known bounded surfaces are detected. The detection may occur using a set of sample tracking data recorded by the tracking at 208. Using the sample data, at 212, the known bound surface constraints are modeled statistically based on knowledge of the bounded area and the known surfaces. For example, some bounds are invariant while others, such as backer boards, may "flex" when impacted by a puck. Those surfaces that are invariant can be modeled with no variation in one or more of the coordinates defining a position of a tracked object engaging the known surface. Those surfaces that have some flex may be modeled to incorporate some deviation in the position determined for an object engaging the surface.

At 214, a map of the bounded surfaces is created based on the outermost excursions of tracked objects and known surfaces. Where the coordinate system is defined in terms of a three dimensional Cartesian coordinate system, for any given known surface, the coordinates of a detected position of an object engaging the surface are constrained such that the position of the object as defined in the coordinate system is known from the map in at least one dimension based on the object's interaction with the known surface. For example, a position of an object on the surface of the ice in a hockey rink has a known position defined in the z dimension (FIG. 1), and may be defined as "0" as a puck can never move below the plane of the ice. In another example, a puck engaging a board at a given location may have an x or y dimension constrained (absolutely or within a statistical variation) during the parameter estimation process discussed below.

At 216, the tracking data is used to estimate system-wide parameters for the system 200 to allow the system 200 to more accurately track objects within the bounded area. Step 216 may be performed at any point following establishment of the map, including during the performance of an event, or step 216 may be performed periodically to calibrate the system 200 for accuracy in tracking objects.

Generally, step 216 is performed by utilizing bundle adjustment techniques on data from all sensors in the system. For any tracked object in the system, some position error may result from actual sensor measurements or calculations made from measurements by any two sensors in the system. That is, for any two sensors, the measured or calculated position based on the data from the sensors may differ and such difference may be a result of an incorrect determination of one or more parameters in the sensor. Because of the large number of sensors, each having a number of parameters which may be causing the error, bundle adjustment can be used to determine a "best fit" of all errors in the system.

At 218, once new values for sensor parameters are determined by a minimization of the total system error, the new system parameters may be utilized in tracking objects during an event. Tracking with the new sensor parameters is therefore more accurate following the estimation process of the present technology.

Figure 5:
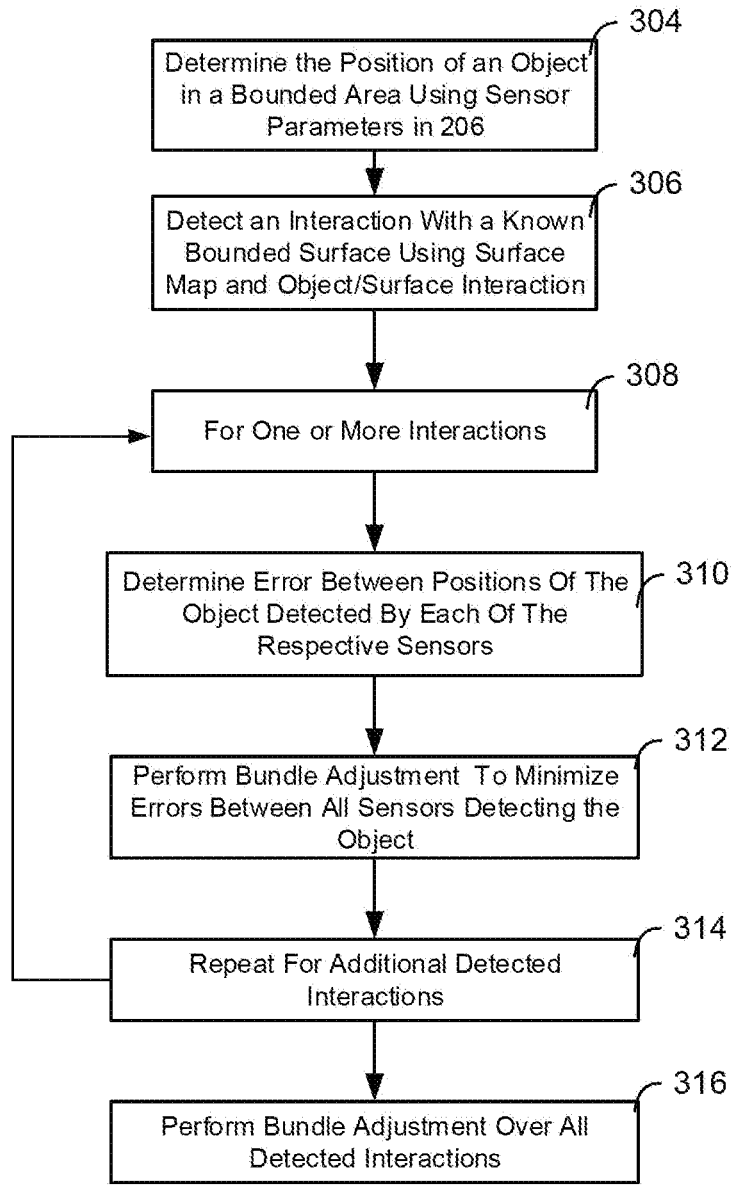
FIG. 5 is a flowchart illustrating a process of minimizing sensor error to estimate sensor parameters for tracking objects.

FIG. 5 illustrates the estimation of new values for sensor parameters, and one embodiment for preforming step 216 of FIG. 4.

The method of FIG. 4 may be performed, as noted above, on a set of recorded sample data. Alternatively or in addition, the method of FIG. 4 may be performed in real time on currently recorded data of positions when tracking an object during an event. At 304, the position of an object within a bounded area is determined. From the positional data and the map developed at step 214, an interaction with a known bounded surface is determined at 306. An interaction with a bounded surface may be determined with reference to the map and the object's motion relative to known boundaries on the map. Simply, if the object engages a known surface, movement of the object will be altered in a predictable manner based on the motion of the object toward the surface and a change in direction of the object after engaging the surface.

At 308, for one or more detected interactions at a point in time, at 310, in one embodiment, the positional error between the respective positions of the object based on measured sensor data for each sensor having the object interaction within its field of view is determined, and the difference between the positions detected by different sensors—the error in the computed line of position (LOP) resulting from each sensor—is determined. In another embodiment, at 310, the error between a measured position of the object—the LOP—and measurements implied by estimating the positions of an object and current parameters of each sensor is determined. In this latter embodiment, while a given pixel in a sensor may represent the measured position of an object in the sensor (pixel) array, the estimated position of the object for the sensor may represent the pixel which would represent the object based on an estimate of the object position and the current sensor parameters. The present technology can be applied to minimize either or both types of errors of the aforementioned embodiments.

Step 308 results in a set of errors is known for a given detected position of an object in time and interacting with a known boundary.

At 312, for the set, bundle adjustment techniques are utilized to minimize the errors between the locations determined based on the data accumulated by the respective sensors. Bundle adjustment techniques attempt to minimize the error between the image locations of observed image points between the respective sensor locations. The total sensor error between the detected positions can be expressed as the sum of squares of a large number of nonlinear, real-valued functions. Thus, the minimization is achieved using nonlinear least-squares algorithms.

Bundle adjustment is a process of jointly refining a set of initial camera and structure parameter estimates for finding the set of parameters that most accurately predict the locations of the observed points in the set of available images.

However, in accordance with the present technology, constraints based on the known surfaces which define known limits on the Cartesian positions of the detected object are utilized in bundle adjustment process to constrain object positions relative to the surface model.

In one example of bundle adjustment, almost any predictive parametric model can be handled, i.e. any model that predicts the values of some known measurements or descriptors on the basis of some continuous parametric representation of the world, which is to be estimated from the measurements. In one example, a scene may be modelled by individual static 3D features $X_p$, p=1 . . . n, imaged in m shots with sensor (camera) pose and internal calibration parameters $P_i$, i=1 . . . m. There may also be further calibration parameters $C_c$, c=1 . . . k, constant across several images (e.g., depending on which of several sensors was used). Given uncertain measurements $\underline{x}_{ip}$ of some subset of the possible image features $x_{ip}$ (the true image of feature $X_p$ in image i). For each observation $\underline{x}_{ip}$, one can assume a predictive model $\underline{x}_{ip}=x(C_c,P_i,X_p)$ based on the parameters, that can be used to derive a feature prediction error:

$$\Delta \underline{x}_{ip} x(C_c,P_i,X_p) = \underline{x}_{ip} - x(C_c,P_i,X_p)$$

In the case of image observations, as here, the predictive model is image projection, but other observations such as 3D measurements can also be included which is useful in the present context. To estimate the unknown 3D feature and camera parameters from the observations, one minimizes a measure of their total prediction error. Bundle adjustment models this prediction, starting from given initial parameter estimates provided in step 206. Thus, the problem becomes a matter of optimizing a nonlinear cost function (the total prediction error) over a large nonlinear parameter space (the scene and sensor parameters).

The bundle adjustment parameter space is generally a high-dimensional nonlinear manifold—a large Cartesian product of projective 3D feature, 3D rotation, and camera calibration manifolds, perhaps with nonlinear constraints. The cost function f(x) quantifies the total prediction (image re-projection) error of the model parametrized by the combined scene and camera parameters x.

Bundle adjustment is a parameter estimation problem. Any parameter estimation paradigm could be used, but for the present technology a function whose output is a single parameter vector that minimizes a predefined cost function designed to measure how well the model fits the observations and background is used.

A well-known parameter estimation method is nonlinear least squares. Suppose that we have vectors of observations $z_i$ predicted by a model $z_i=z_i(x)$, where x is a vector of model parameters. Then nonlinear least squares takes as estimates the parameter values that minimize the weighted Sum of Squared Error (SSE) cost function:

$$f(x) = \frac{1}{2}\sum_i \Delta z_i(x)^T W_i \Delta z_i(x)$$

$$\Delta z_i(x) = \underline{x}_i - z_i(x)$$

Where, $\Delta z_i(x)$ is the feature prediction error and $W_i$ is an arbitrary symmetric positive definite (SPD) weight matrix. The W, should be chosen to approximate the inverse measurement covariance of $\underline{z}_i$.

The function above is constrained by limiting the observation vectors Z, based on the known object position in at least one dimension resulting from the interaction of the object (e.g. the puck) with the known bounding surface. That is, any observation data resulting in a projected (calculated) position for an object that does not agree with a position in at least one dimension that results from reference to the position which may be known from an interaction point on the surface map generated at step 214 is constrained to the position known from the map, rather that the calculated position during calculation of the cost function.

The result of the constrained solution provides a set of sensor parameters for each sensor which provides the minimal system error for all sensors which detect object position at a point in time (i.e. a time-specific position). The modified sensor parameters can then be utilized in future tracking of objects using system 200 and in accordance with the teachings of U.S. Pat. No. 5,862,517.

At step 314, the process of step 312 may be repeated for any number of detected interactions.

At 316, the bundle adjustment may be utilized to minimize the total system error over a number of sets of parameters derived for each of the individual detected interactions at 308.

Figure 6:
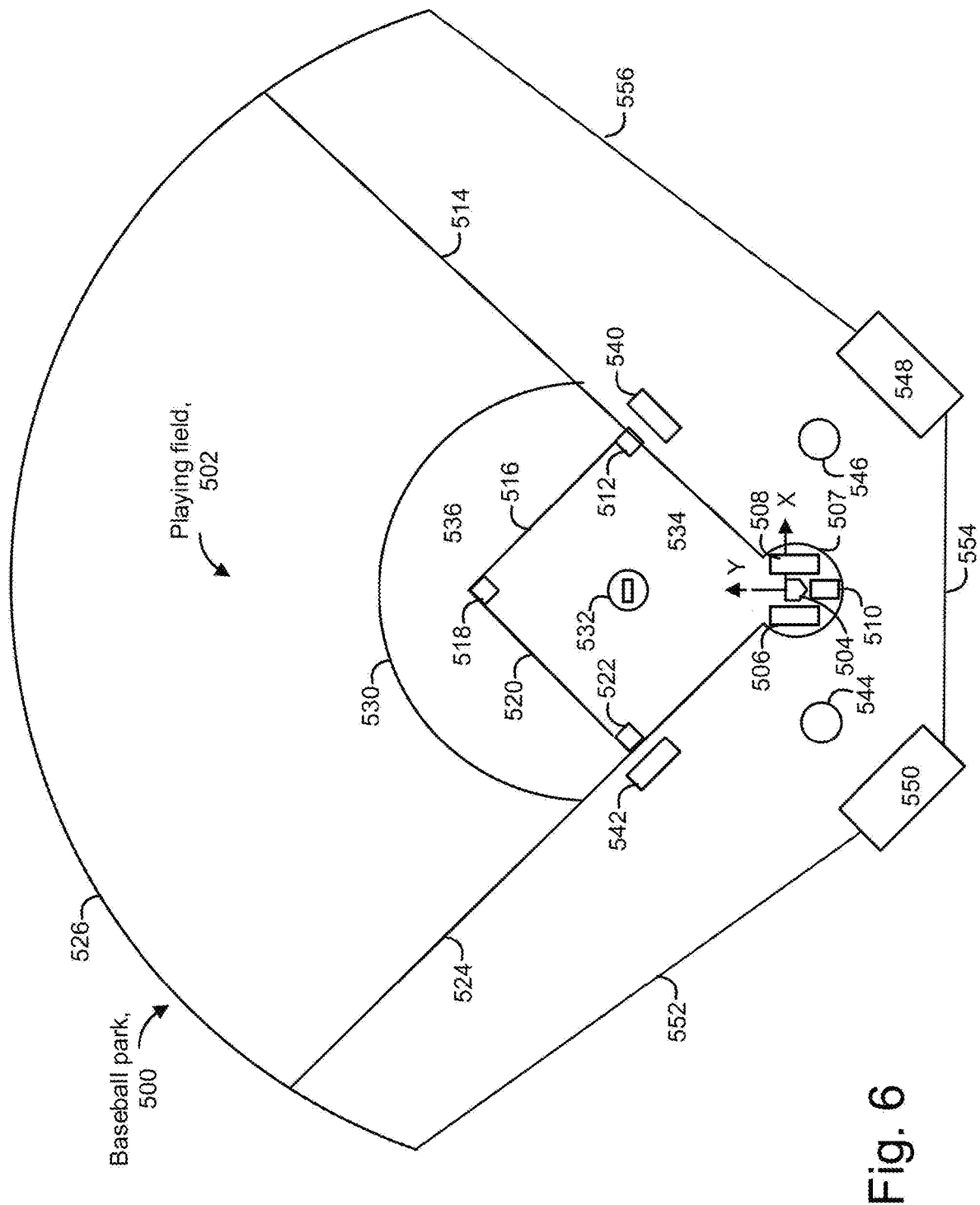
FIG. 6 is an illustration of known bounded surfaces in a baseball park.
Figure 7:
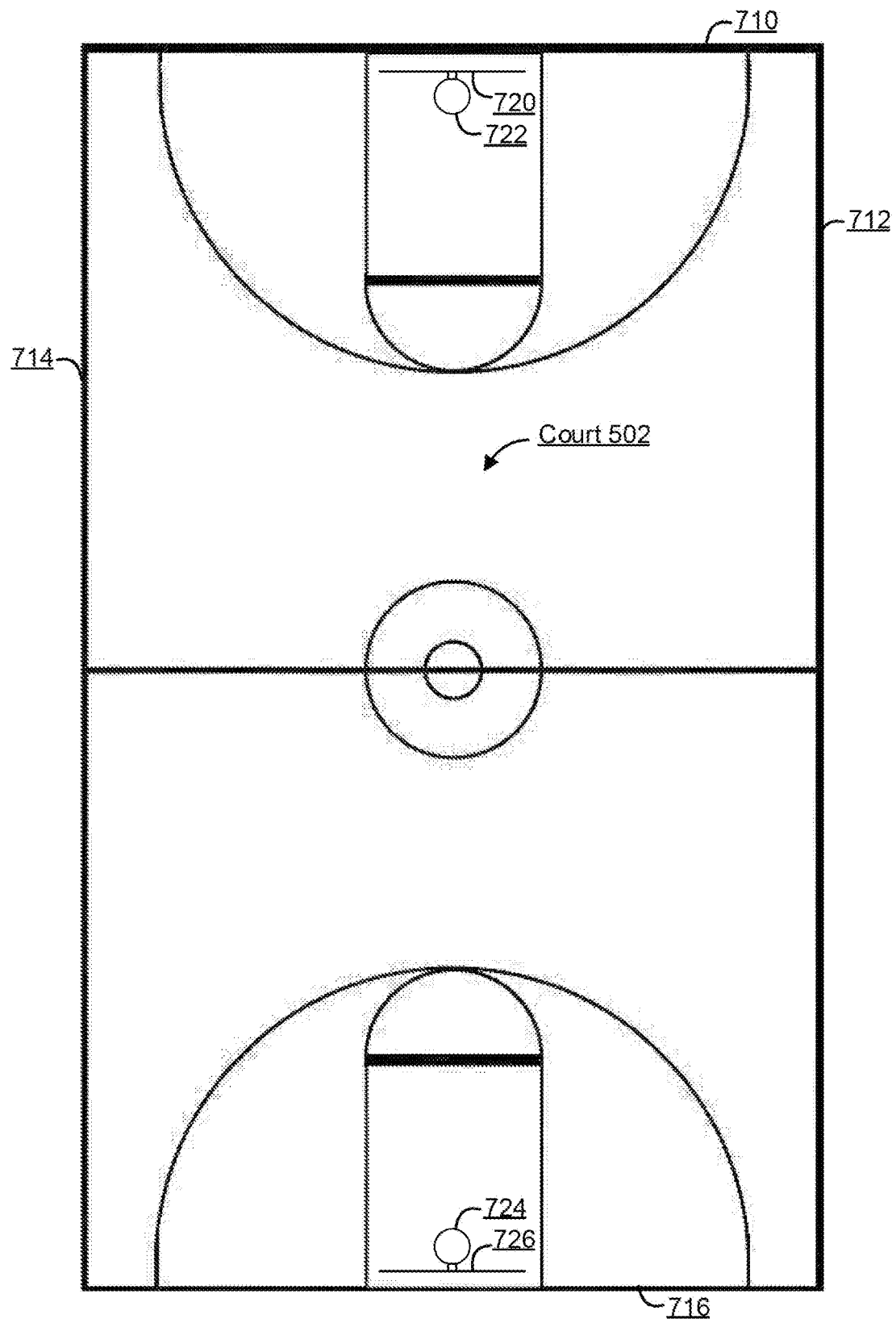
FIG. 7 is an illustration of known bounded surfaces in a basketball court.

While the technology has been illustrated with respect to a well-bounded hockey rink, it should be understood that the technology may be utilized in arenas having less known bounded surfaces. FIGS. 6 and 7 illustrate additional arenas wherein the above techniques may be utilized. For Example, FIG. 6 illustrates a baseball park 500. Tracking of an object such as a baseball during a baseball game can occur using the techniques described in U.S. Pat. No. 5,862,517 using sensors having optimized parameters calculated as discussed herein. The baseball park 500 can be a baseball stadium or a smaller facility, and includes a playing field 502. The playing field 502 can be arranged according to standard rules of baseball. The fair territory boundaries of the playing field are the foul lines 514 and 524, the outfield boundary 526 which may be a fence or wall, and the semicircle 507 around home plate 504. Line 530 is the boundary between the outfield 538 and the infield. The infield includes a square/diamond region (including two sides 520 and 516) between the four bases 504, 512, 518 and 522. The infield also includes a curved region 536 which is between the regions 534 and 538. Also provided are: a left-side batter's box 506, a right-side batter's box 508, a catcher's box 510, a first base coach's box 540, a third base coach's box 542, a pitcher's mound 532, on-deck circles 544 and 546, and dugouts 550 and 548. Foul territory may be bounded by walls 552, and 556, and a backing screen 554.

Known bounded surfaces in the baseball park 500 may include the outfield boundary fence 526, walls 552, 556, screen 554 and field 502. Other surfaces, such as the walls of the dugouts 548, 550, may also be known bounded surfaces and mapped in accordance with the method of FIG. 3

FIG. 7 is a plan view of a basketball court 600 which may be provided in an arena, stadium or smaller facility, and surrounded by a structure including facilities for mounting sensors suitable for tracking objects, such as a basketball, during a game. In FIG. 7, the basketball court 600 includes a playing surface 602, out-of-bounds lines 710, 712, 714, 716 painted or otherwise marked on the playing surface 602. A basketball court 600 includes two hoops 722, 724 and two backboards 720, 726. The objective is to shoot a ball through a hoop 722, 724 which is 18 inches in diameter and 10 feet high mounted to a backboard at each end. The hoop has a backboard 720, 726 that measures 6 feet by 3.5 feet. Generally, the top of the hoop 722, 724 is exactly 10 feet above the court and 4 feet inside the baselines 710, 716. For men, the official ball is 29.5 inches in circumference and for women the official basketball size is 28.5 inches in circumference.

Known bounding surfaces of the basketball court are more limited and may comprise the backboards 720, 726 and the baskets 722, 724. Constraints based on interaction between a tracked basketball and the known surface of the backboard may be made and utilized in a manner similar to any known bounded surface as in the hockey example. Statistical modeling of the variance between the size of the basketball and the rim may likewise be used to constrain the position of the basketball as it passes through the rim to a known and mapped position of the rims 722, 724.

As should be understood, other arenas and events may have bounding surfaces. Consider, for example, the sport of motocross, is a form of off-road motorcycle racing held on enclosed off-road circuits. The tracks are generally dirt and include bumps, jumps and other obstacles forming a three-dimensional bounding surface within the boundaries of a track. The surface of the track itself may comprise a known bounding surface which can be modeled in a surface map as in step 214, and with, for example, infrared emitters placed at known locations on a motorcycle, the technology described herein may be used to constrain the position of a tracked object—in this instance a motorcycle—in at least the z dimension as the motorcycle moves about the track.

Various other events and objects may likewise be tracked in other events.

FIG. 8 depicts further details of the processing center 264 and sensors of FIG. 1. The computer system 870 is a simplified representation of a system which might be used at the processing center 864 (FIG. 7A), for example. The computer system 870 includes a storage device 871 such as a hard disk or portable media, a network interface 872 for communicating with other computer systems, one or more processors 873 for executing software instructions, a working memory 874 such as RAM for storing the software instructions after they are loaded from the storage device 871, for example, camera interfaces 875A, 875B and 875C, and a user interface display 876. The camera interfaces 875A, 875B and 875C can be referred to collectively as camera interfaces 875, or individually as a camera interface 875. The storage device 871 may be considered to be a processor readable storage device having processor readable code embodied thereon for programming the processor 873 to perform methods for providing the functionality discussed herein. The user interface display 876 can provide information to a human operator based on the data received from the cameras 860 via the camera interfaces 875. The user interface display 876 can use any known display scheme, whether graphical, tabular or the like. In addition to an on-screen display, an output such as a hard copy from a printer can be provided to report results. Results can also be reported by storing data at the storage device 871 or other memory, e.g., for later use. Results could also be sent via the network interface 872 and the Internet or other wide area network, to another, central storage location. In certain embodiments, the results can include a digital record of a baseball game or portions thereof.

Portions of the functionality described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data. Combinations of any of the above are also included within the scope of computer readable media.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed embodiments. For example, it would be possible to combine or separate some of the steps shown in FIG. 3, and/or in other flow diagrams. Further, it may be possible to change the order of some of the steps described above, without substantially changing the overall events and results, e.g., in instances where a step doesn't rely on the results of a previous step.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

The invention claimed is:

1. A method of tracking an object comprising:
receiving sensor data from a plurality of sensors;
wherein the plurality of sensors comprises at least one visible and/or infrared sensor;
detecting a plurality of bounding surfaces in a bounded area from the plurality of sensors;
detecting at least one object within the bounded area from the plurality of sensors;
determining the positions of the plurality of bounding surfaces within the bounded area;
analyzing, in real time, at least one interaction of the at least one object with the plurality of bounding surfaces; and
transforming a three-dimensional location of the at least one object in a video frame to a two-dimensional position in a broadcast camera.

2. The method of claim 1, further comprising determining sensor parameters for the plurality of sensors based on one or more bundle adjustment techniques.

3. The method of claim 1, wherein the plurality of sensors includes at least one pulse detector.

4. The method of claim 1, wherein the plurality of sensors is operable to determine the three-dimensional location of the at least one object.

5. The method of claim 4, wherein a surface map provides at least one boundary condition for determining the three-dimensional location of the at least one object.

6. The method of claim 1, wherein the three-dimensional location is transformed into the two-dimensional position by multiplying the three-dimensional location by a camera matrix (K).

7. The method of claim 1, further comprising determining a change in direction of the at least one object based on the sensor data.

8. A non-transitory computer readable storage medium including computer readable program code for tracking an object comprising:
a processor operable to receive data from a plurality of sensors, wherein the plurality of sensors comprises at least one visible and/or infrared sensor; and
a memory including the computer readable program code, wherein the computer readable program code includes:
code operable to determine the positions of a plurality of bounding surfaces within a bounded area based on the data from the plurality of sensors;
code operable to cause the processor to analyze, in real time, at least one interaction of the object with the plurality of bounding surfaces; and
code operable to transform a three-dimensional location of the object in a video frame to a two-dimensional position in a broadcast camera.

9. The non-transitory computer readable storage medium of claim 8, wherein a position of the object is determined based on at least one interaction of the object with the plurality of bounding surfaces.

10. The non-transitory computer readable storage medium of claim 9, wherein a surface map provides at least one boundary condition for determining the three-dimensional location of the object.

11. The non-transitory computer readable storage medium of claim 8, wherein the three-dimensional location is transformed into the two-dimensional position by multiplying the three-dimensional location by a camera matrix (K).

12. The non-transitory computer readable storage medium of claim 8, further comprising code operable to cause the processor to determine sensor parameters for the plurality of sensors based on one or more bundle adjustment techniques.

13. The non-transitory computer readable storage medium of claim 8, wherein the determination of the position of the object is based on the data from the plurality of sensors.

14. The non-transitory computer readable storage medium of claim 8, wherein the memory is operable to accumulate the data from the plurality of sensors and further comprising code operable to determine a change in direction of the object based on the data from the plurality of sensors.

15. An apparatus for tracking an object comprising:
a processor in communication with a plurality of sensors, wherein the plurality of sensors comprises at least one visible and/or infrared sensor;
wherein the processor is programmed to:
receive position data from the plurality of sensors;
determine the positions of a plurality of bounding surfaces within a bounded area;
determine the position of an object within the bounded area;
analyze, in real time, at least one interaction of the object with the plurality of bounding surfaces; and
wherein the apparatus is operable to receive a three-dimensional location of the object in a video frame and is operable to transform the three-dimensional location of the object in the video frame to a two-dimensional position.

16. The apparatus of claim 15, wherein motion of the object is constrained during an interaction of the object and at least one of the plurality of bounding surfaces.

17. The apparatus of claim 15, wherein the three-dimensional location is transformed into the two-dimensional position by multiplying the three-dimensional location by a camera matrix (K).

18. The apparatus of claim 15, wherein the apparatus is operable to modify sensor parameters of the plurality of sensors based on one or more bundle adjustment techniques.

19. The apparatus of claim 15, wherein the apparatus is further operable to determine a change in direction of the object based on the data relating to a position of the object obtained by the plurality of sensors and the interaction between the object and the at least one of the plurality of bounding surfaces.

20. The apparatus of claim 15, wherein a surface map provides at least one boundary condition for determining a three-dimensional location of the object.

\* \* \* \* \*